United States Patent [19]

Maix

[11] Patent Number: 4,966,800

[45] Date of Patent: Oct. 30, 1990

[54] CONVERTIBLE TEXTILE FIRE BLOCK MATERIAL

[76] Inventor: Anton Maix, P.O. Box 21306, Ft. Lauderdale, Fla. 33335

[21] Appl. No.: 309,835

[22] Filed: Feb. 9, 1989

Related U.S. Application Data

[63] Continuation of Ser. No. 757,478, Jul. 22, 1989, Pat. No. 4,898,757.

[51] Int. Cl.$^5$ .............................................. B32B 3/02
[52] U.S. Cl. ........................................ 428/97; 428/85; 428/95; 428/225; 428/920; 428/255
[58] Field of Search ...................... 428/95, 97, 85, 225, 428/920, 255

[56] References Cited

U.S. PATENT DOCUMENTS 4,513,042 4/1985 Lumb ................................... 428/97
4,689,256 8/1987 Slosberg et al. ..................... 428/97

*Primary Examiner*—James J. Bell
*Attorney, Agent, or Firm*—Maline, Haley, McHale, DiMaggio & Crosby

[57] ABSTRACT

A new and improved fire block textile material comprising a carrier means and a textile material means that provides a cover in a first state and a fire block barrier in a second state. The textile material includes a wool yarn material formed as the face layer of the textile material which is convertible by heat from a fire into a fire barrier layer. Wool yarn material is connected to and carrier by an under construction material or carrier means. Said carrier means supports the wool yarn material in its first normal state as a textile and supports the charred portion of the wool yarn material in its second charred state as a fire block layer. The wool yarn material has a structure which permits it to bead on exposure to the flux of heat from a fire. The bead recedes or travels along the yarn away from the source of the heat while the fire barrier layer acts as a temporary fire block. A plurality of such beads connect together to form a surface which acts both as a barrier to flame and a barrier to heat transfer to the carrier means and to the material below the carrier means.

11 Claims, 2 Drawing Sheets

CONVERTIBLE TEXTILE FIRE BLOCK MATERIAL

This application is a continuation of application Ser. No. 6/757,478, filed July 22, 1989 U.S. Pat. No. 4898757.

BACKGROUND OF THE INVENTION

1. Field of the Invention:

A textile product providing a normal textile material having one face layer that is convertible by flux of heat into a charred fire block even at temperatures up to approximately two thousand degrees farenheit.

2. Description of Related Art:

All too commonly a fire may begin when a cigarette falls onto upholstery or into clothes as a person falls asleep holding a burning cigarette. A cigarette, of course, is designed to sustain steady smoldering combustion. The cigarette continues its smoldering combustion where it falls. Sometimes the cigarette continues to smolder for hours, filling the house with toxic vapors. At other times the smoldering cigarette changes into flaming combustion. With an open flame to heat up adjacent objects to their ignition temperatures, the second phase—the phase of exponential growth—begins. Exponential growth begins more quickly during such occurrences as airplane crashes. Burning of seat cushions beneath textile covers adds to quick exponential growth.

When it comes to doing something to prevent or halt catastrophes that occur from exponential growth of fires, measures have been taken in part by recognizing that portions our surroundings are combustible and add fuel to a fire. Even though people know concrete and steel do not support combustion under ordinary circumstances, they will not live in such an ambiance, wearing asbestos clothes and sitting on ceramic or metal chairs. The fact that the environment of a house or airplane is combustible does not persuade people to dispense with the amenity of the clothes they wear, the bedding in which they spend a fourth of their lives, the drapes at the window, the chair and desk in the den, the upholstered furniture in the living room or in the plane cabin. The gypsum materials in the wall and the ceiling will not burn, but the wallpaper will and molding will. The frame of the house is wood, the roof is wood, perhaps with asphalt shingling, and the exterior is probably wood, at least in part. An airplane includes plastic ceiling, seat cushions and walls. The structures could, of course, be made safe from fire, as the stone, brick, and concrete of many of the multiple-occupancy dwellings in the cities or metal materials used in many military aircraft. Even today the contents of the structure of airplanes remain as combustible as before.

1. The material properties including density, total heat content, heat capacity, thermal conductivity, chemical analysis and heat of gasification.

2. Behavior of samples in fire tests depend upon ease of ignition, rate of heat release, rate of surface flame spread, rate of smoke release, rate of toxic gas release and radiant power from flame.

3. Critical variables in a fire in an occupancy including temperature vs. time, smoke particulates vs. time and toxic gas vs. time.

4. Impact on life including thermal effects and toxic effects.

Inherently fire-resistant polymers have been fashioned for use in the clothing of people whose occupations expose them to the hazards of fires. The more familiar polymers, natural and synthetic, in common use for clothing, house and airplane furnishings such as appliance housings and furniture made of molded polymers may be upgraded for fire resistance. The strategy is to add to the polymer—in its synthesis or by impregnation or by coating—certain elements that share the curious property of interfering at one stage or another in the chemistry and physics of combustion. Principal among these are phosphorus, antimony, boron, chlorine, and bromine. The phosphorous compounds act by alterning the decomposition of the fuel. For cellulose the mechanism is well known. The phosphorous compound decomposes in the heat of the fire to form phosphoric acid, which then reacts with cellulose to produce large amounts of carbon char, at the expense of the reactions that normally would generate combustible gases. Such treatment makes a material hard to ignite with a small ignition source. The reactive halogens, chlorine and bromine, function in the chemistry of the flame itself as "radical poisons," terminating radical chain reactions that occur in the flame. The compound containing the halogen first vaporizes and then decomposes to intercept radicals essential to the propagation of the flame reactions. An example is the removal of a hydrogen free radical by a bromine compound:

$$RBr + H. \rightarrow HBr + R.$$

In this reaction the sluggish organic fragment, R., replaces the hydrogen radical.

The cellulose textiles, cotton or rayon (from wood pulp), are most often treated with phosphates or borax-boric-acid mixtures. To secure resistance to water in laundering, the phosphorous may be locked into the cellulose by reacting the cellulose with a phosphorous-containing compound or, in the synthesis of rayon, by., polymerizing the monomer with a phosphorous-containing monomer. This technology is employed in making textiles for children's sleepwear, which is almost the only protective measure established by the upsurge of national concern about fire at the beginning of the last decade.

For the protection of such people textiles are now available made of inherently fire-resistant synthetic-polymer fibers. The materials are expensive, and they do not make up into attractive fibers for everyday wear. They serve well, however, in coveralls, flight suits, and uniforms, and they have a record of saving their wearers from calamity.

One family of fibers, marketed as the aramids by the DuPont Company, consists of aromatic (benzene-ring-containing) versions of nylon, such as DuPont's NOMEX.

Nylon melts easily (and can cause severe burns by so doing, without burning) and burns with the help of sufficient heat from a fire. The aramid fiber does not melt or burn, but chars and stiffens.

Whereas the aramid fiber has a hydrogen on its nitrogen, offering oxygen a site of oxidative attack, another structure—the aromatic imide polymer—does not. Exposed to direct flaming, it shrinks and blackens but is not consumed and does not produce much smoke.

SUMMARY OF THE INVENTION

This invention relates to a new and improved fire block textile material. The fire barrier textile material includes a carrier means and a textile material means that provides a cover in a first state and a fire block or barrier in a second state.

At least a portion of the textile material is a wool untreated with fire retardant materials and is convertible by fire, or flux of heat, into an effective fire barrier or fire block material. The textile material includes a wool yarn material formed as the face layer of the textile material and convertible by the heat from a fire into a fire barrier layer. The wool yarn material is connected to and carried by an under construction material or carrier means. The under construction carrier supports the wool yarn material in its first normal state as a textile and supports the charred portion of the wool yarn material in its second charred state as a fire block carrier. The wool yarn material has a structure capable of beading under the flux of heat from a fire. The bead of charred material recedes or travels along the yarn away from the source of the flux of heat while the fire barrier layer acts as a fire block. The bead is relatively strong and is firmly connected to the wool yarn as it recedes and after the flame is removed.

The wool yarn material is untreated with fire retardant chemicals. The wool yarn material produces the lowest amount of toxic gases when subjected to flux of heat, even up to 2000 degrees farenheit.

The carrier, when using special rayon such as VISCOSE by American Rayon and woven very densely, includes a plurality of through openings. There is a special rayon material that is a slow burning material which allows only low toxicity. The special rayon material continues to hold the form of its weave allowing the screen construction to support the charred residue of the wool face. The charred wool face not only remains intact, but provides the secondary phase of appearance of the textile material product that is firm, resistant to touch or gravity, that is completely flame retardant, or even flameproof and resistant to penetration of heat resulting in means to limit conduction of heat from a source beyond the newly created fire wall. The perimeter of each opening is surrounded by the carrier means. The carrier is the warp and weft formed by known textile processes. The carrier may be a rayon such as the material known as SUPEREX.

The wool yarn material with a fire resistant under construction material remains intact when subject to a flux of heat of 2200 degrees farenheit or above for a few minutes or more without burning the carrier or the rear portion of the wool yarn material.

The problem solved by this invention is the manufacturing of a fabric which in its final manufactured state is flame resistant but not flameproof but in its secondary state after ignition of the flame side portion of the wool material becomes flameproof. This is accomplished by this invention without the use of chemicals. The fire block or barrier created continues to remain in its secondary state preventing the flux of heat and flames from spreading. The fabric in its second state acts as a fire block to anything that it covers thereby preventing the release of toxic gases from covered material and preserving oxygen in a confined area as well as life by controlling the spread of flames and confining the fire to a limited area where it may be controlled and/or, extinguished.

The technique of weaving this unique textile makes it applicable for clothing, wallcovering, textiles of all types, upholstery, draperies, curtain material, carpeting and it may be produced in all densities, weights and widths.

The solution entails the utilizations of two types of yarns. The first yarn is inherently flame resistant but burns slowly and chars. The second yarn which comprises the carrier layer is flame resistant and may be artificially produced, exhibits slower ignition and burn, and acts as a carrier screen to support the charred remains of the first yarn. The second yarn when woven provides a screen having properties upon which the charred residue of the first yarn may attach itself. The first yarn is woven principally on the face of the carrier layer. The largest proportion of the first yarn is in the pile of the fabric. The second yarn is in the warp and the weft providing a support screen and under construction to hold the first yarn tightly and making the pile very dense. It could also be a binding warp. The second yarn is the construction which holds the wool in its material or burned state and provides a position for the charred wool fire block layer to adhere to in its second state after the flame.

The principle of this construction is to provide a surface of a textile that will be resistant to flame, because of the nature of the yarn, such as wool, which will burn and in burning will char. The charring will be left hanging on the remaining wool pile on the back side of the fabric and on the screen of the closely knit warp and weft of the second yarn. The textile in its final state has a charred surface, completely covering a carrier screen which has not been consumed by the flux of heat or flame and lends a backing to the charring. The textile in the second state is flameproofed because the a wool's original state was change by fire and thereafter continues to perform as a block to fire and the flux of heat.

It is an object of this invention to provide a noncomplex material structure that is useable as a textile that is capable of partially changing state to provide a layer that is capable of partially changing state to provide a layer that acts a a fire block.

Another object of the invention is to provide a convertible textile that does not produce toxic gases due to chemical treatment of the textile with fire retardant chemicals.

In accordance with these and other objects which will be apparent hereinafter, the instant invention will now be described with particular reference to the accompanying drawings.

DESCRIPTION OF THE PREFERRED EMBODIMENT

Figure 1:
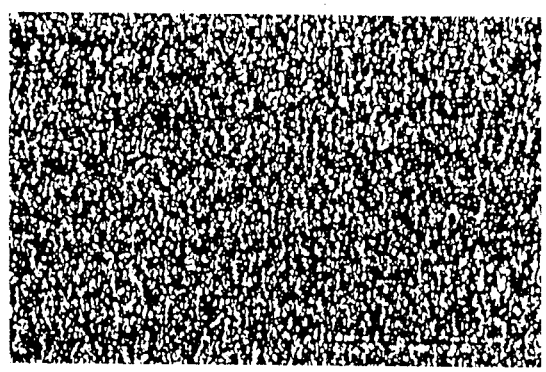
FIG. 1 is a top view illustration of the textile material product in the first state.
Figure 2:
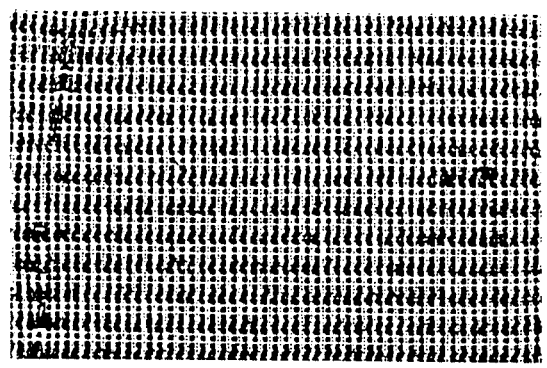
FIG. 2 is a rear view illustration of the textile material product in the first state showing a rear face.
Figure 3:
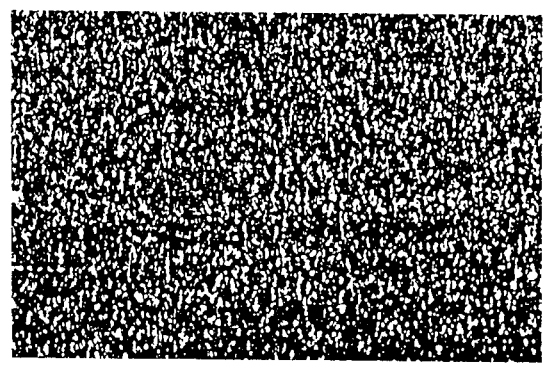
FIG. 3 is a top view illustration of the textile material product in the second state.
Figure 4:
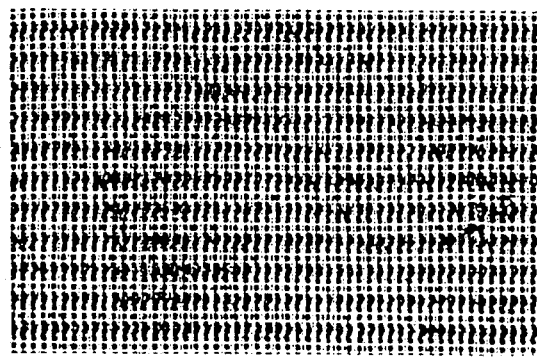
FIG. 4 is a rear view illustration of the textile material product with the front in the second state.
Figure 5:
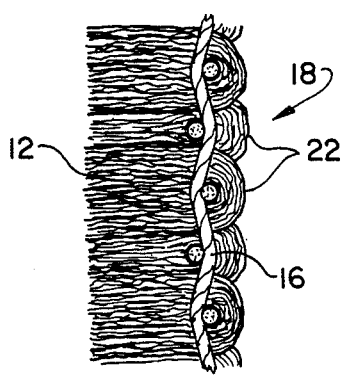
FIG. 5 is a side view illustration with the left side in the first state.
Figure 9:
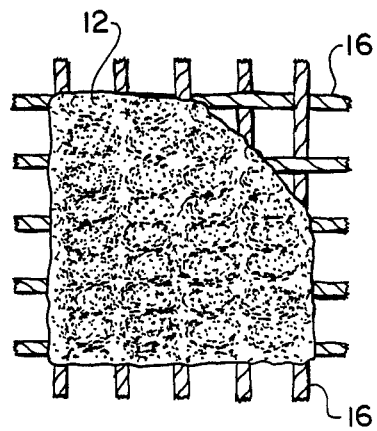
FIG. 9 is a front view illustrating the wool pile.

Referring now to the drawing FIGS. 5 through 10 the flux of heat from an external source of radiation such as a flame 10 raises the temperature to the ignition point of the pile surface 12 of the wool yarn, on the warp and weft of the under construction carrier means 14 of a flame resistant second yarn 16 that does not burn and char in the convertible textile material product 18. After ignition illustrated in FIG. 6 there is an additional flow of heat to the surface of the wool yarn by radiation from the flame 20.

Figure 6:
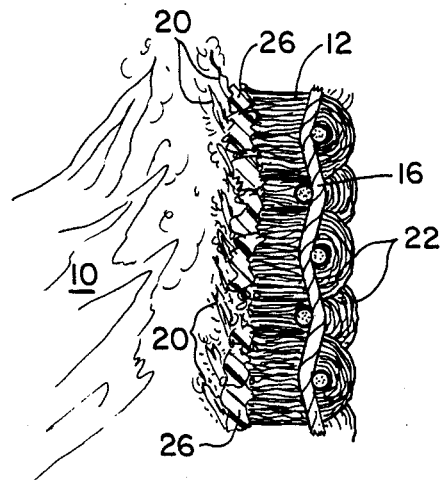
FIG. 6 is a side view illustration with the left side in between the first and second state.
Figure 10:
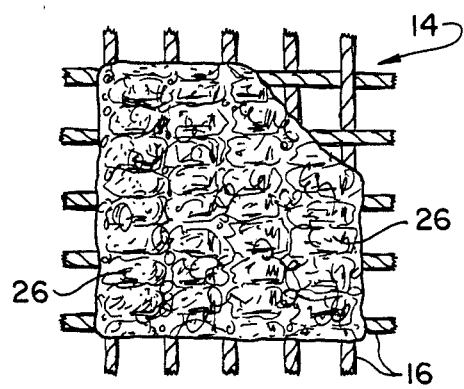
FIG. 10 is a front view illustrating the carrier means.

A chemical reaction occurs in the wool pile 12 dependant on temperature, reaction rate, and combustion reactions. The wool beads due to the low heat conductivity. The incident energy accumulates on the surface while the interior surface 22 or surface opposite the flux of heat remains relatively cool. Even with the front surface aflame, the block of insulation 24 grows from the beads 26 in FIG. 6 to allow the inside to remain relatively cool. The wool yarn is resistant to burning but does burn when in contact with flame up to and above two thousand degrees farenheit. The wool does not melt. Rather, the wool yarn readjusts itself by blackening, charring, and receding toward the warp and weft of the second yarn as shown in FIG. 6 and more or less assumes a carbon bead like shape over and partially between the warp and weft of the second under construction yarn with the bead-like blackened, charred, chemically changed remnants of wool yarn spreading laterally over the warp and weft forming a charred layer 28 of thermally changed wool yarn. The residue is blackened and charred wool yarn that grows together to become a block of insulation 24, shown in FIG. 8. The wool yarn does not pass through a liquid phase. The wool yarn passes through a process known as pyrolysis, decomposition by fire or flux of heat.

Figure 7:
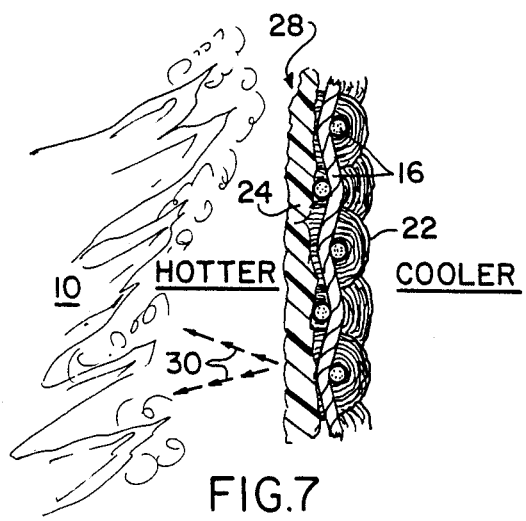
FIG. 7 is a side view illustration with the left side in the second or fire barrier state.
Figure 8:
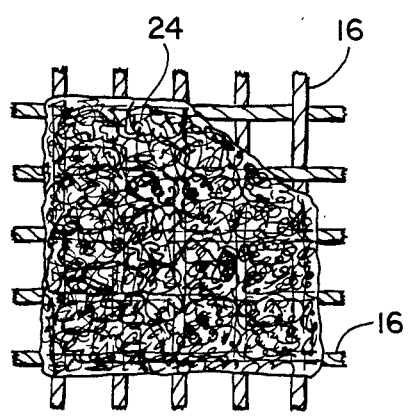
FIG. 8 is a front view illustrating the fire barrier.

The charred wool yarn or ash has insulating effects and reflects the flux of heat back toward the source of the intruding flux of heat, see numeral 30. Layer 28 also insulates the warp and weft of carrier means 14 of the second under construction yarn from heat energy flow by radiation as shown in FIG. 7.

The test conducted on many prototypes of the textile product failed. This invention tested successful when the fire resistant carrier material 14 of rayon was placed on the back of the wool material 12 to allow the charred high pile wool material 24 to cling to the high pick warp and weft of the rayon carrier material 14.

The illustrated textile material is a product that includes wool yarn as pile and a rayon fire retardant material as the warp and weft screen backing. It should be noted that this technique is applicable to other weaves such as flat woven, jacquard, tapestry, etc. The backing is of a high package. The package may be as high as 100 picks or more. The wool pile has high thread count. The wool pile may be as high as 50 or more. The textile product has a relatively small heat content, low heat capacity, low thermal conductivity. The textile product is resistant to ignition, has a small rate of heat release, has a very low rate of surface flame spread, low rate of smoke release, has a very low rate of toxic gas and smoke release, and a low radiant power from flame. When flux of heat is directed toward the front side of the textile material there is little rise of temperature over a relatively significant amount of time at the rear side of the textile material. The textile material has great impact on life in its effect in regard to safety in protecting life and property and in regard to not preventing toxic gases that endanger life.

In the present invention the surface of the textile material facing the heat of flux retards burning but over time will burn at an initial high rate and thereafter be reduced in time as the flame and material is reduced and charred material is increased and the reflectivity and insulating quality of the front surface is increased.

The wool textile material used as a pile in this system may be any live wool or virgin wool. The carrier means may be any rayon that burns slowly and preferably a rayon that burns slower than the wool textile. The carrier means may be a flame retardant yarn and preferably a flame retardant yarn that burns more slowly than the wool textile. For example, DuPont's NOMEX may be used as the carrier. A carbonized yarn may also be used as the carrier means, for example carbonized glass.

This convertible textile material product may be used as an upholstery on airplane seats.

The instant invention has been shown and described herein in what is considered to he the most practical and preferred embodiment. It is recognized, however, that departures may be made therefrom within the scope of the invention and that obvious modifications will occur to a person skilled in the art.

What I claim is:

1. A convertible textile material product having at least a portion of said textile material product convertible by flux of heat into a fire barrier material, comprising:

a textile material means for forming the face of said textile material product in a first normal state, at least a portion of said textile material means convertible by the flux of heat into a fire barrier layer in a second fired state; and a carrier means connected to said material means, said carrier means for supporting said textile material means in said first normal state for use as a textile and for supporting said textile material means in said second fired state for use as a fire block, said carrier means connected to said textile material means in said first normal state and said second fired stated;

said textile material means is wool.

2. A convertible textile material product as set forth in claim 1, wherein:

said wool is a wool free of additional chemical fire retardants.

3. A convertible textile material product as set forth in claim 1, wherein:

said textile material means having a structure capable of beading under the flux of heat on the same side of said textile material product to form beads of charred material connected to the remaining uncharred said textile material means;

said beads of charred material connected to said carrier means and supported in an array of beads as a fire barrier layer on said same side of said carrier means.

4. A convertible textile material product as set forth in claim 1, wherein:

said carrier means is a fire resistant textile material.

5. A convertible textile material product as set forth in claim 3, wherein:

said carrier means including a plurality of through openings with a perimeter of each said opening formed by said carrier means, said charred material covering said through openings.

6. A convertible textile material product as set forth in claim 5, wherein:
said charred material covers said carrier means.

7. A convertible textile material product as set forth in claim 6, wherein:
said beads are connected to adjacent beads to form a complete surface.

8. A convertible textile material product as set forth in claim 7, wherein:
said convertible textile material product is capable of withstanding the flux of that of approximately two thousand degrees farenheit for a few minutes without burning said carrier means.

9. A convertible textile material product as set forth in claim 8, wherein:
said convertible textile material produce is capable of withstanding the flux of heat of four thousand degrees farenheit for a few minutes without burning said carrier means.

10. A convertible textile material as set forth in claim 5, wherein:
said carrier means is structured with approximately 100 picks or more.

11. A convertible textile material as set forth in claim 8, wherein:
said textile material has a relatively high pile of approximately fifth or more.

* * * * *